(12) United States Patent
Leclercq et al.

(10) Patent No.: US 12,508,780 B2
(45) Date of Patent: Dec. 30, 2025

(54) FIBROUS REINFORCEMENT FOR THE MANUFACTURE OF A COMPOSITE PART INTENDED TO BE ARTICULATED WITH OTHER PARTS

(71) Applicants: SAFRAN LANDING SYSTEMS, Velizy-Villacoublay (FR); SAFRAN, Paris (FR)

(72) Inventors: Sylvain Didier Leclercq, Moissy-Cramayel (FR); Quentin Roirand, Moissy-Cramayel (FR); Dominique Marie Christian Coupe, Moissy-Cramayel (FR); Nicolas Tran, Moissy-Cramayel (FR); Pietro Del Sorbo, Moissy-Cramayel (FR)

(73) Assignees: SAFRAN LANDING SYSTEMS, Velizy-Villacoublay (FR); SAFRAN, Paris (FR)

( * ) Notice: Subject to any disclaimer, the term of this patent is extended or adjusted under 35 U.S.C. 154(b) by 0 days.

(21) Appl. No.: 18/877,986

(22) PCT Filed: Jun. 16, 2023

(86) PCT No.: PCT/FR2023/050872
§ 371 (c)(1),
(2) Date: Dec. 20, 2024

(87) PCT Pub. No.: WO2023/247865
PCT Pub. Date: Dec. 28, 2023

(65) Prior Publication Data
US 2025/0269615 A1  Aug. 28, 2025

(30) Foreign Application Priority Data
Jun. 22, 2022  (FR) ...................................... 2206170

(51) Int. Cl.
*B29C 70/24*  (2006.01)
*B29C 70/48*  (2006.01)
(Continued)

(52) U.S. Cl.
CPC .............. *B29C 70/24* (2013.01); *B29C 70/48* (2013.01); *B29K 2063/00* (2013.01);
(Continued)

(58) Field of Classification Search
CPC ....... B29B 11/16; F16C 7/026; D03D 25/005; B29C 70/24; B29C 70/48; B29C 70/446;
(Continued)

(56) References Cited

U.S. PATENT DOCUMENTS

| 5,130,188 A | 7/1992 | Anahara et al. |
| 7,704,429 B2 | 4/2010 | Dunleavy |

(Continued)

FOREIGN PATENT DOCUMENTS

| CN | 102066094 A | 5/2011 |
| CN | 106687662 A | 5/2017 |

(Continued)

OTHER PUBLICATIONS

International Search Report as issued in International Patent Application No. PCT/FR2023/050872, dated Oct. 10, 2023.
(Continued)

*Primary Examiner* — Michael A Tolin
*Assistant Examiner* — Hana C Page
(74) *Attorney, Agent, or Firm* — Pillsbury Winthrop Shaw Pittman LLP

(57) ABSTRACT

A fibrous preform of a core portion of a fibrous reinforcement for a composite material part, the preform having an elongated shape along a longitudinal direction and being formed by first yarns extending along the longitudinal direction with second yarns transverse to the first yarns, the
(Continued)

preform including two longitudinal ends intended for articulation with other parts and a median area located between the longitudinal ends, each longitudinal end having a thickness greater than a thickness of the median area, the median area including a stiffening segment including first non-woven yarns and each longitudinal end including a three-dimensional weave of the first yarns of this stiffening segment with second yarns.

9 Claims, 4 Drawing Sheets

(51) Int. Cl.
    *B29K 63/00* (2006.01)
    *B29K 105/08* (2006.01)
    *B29K 307/04* (2006.01)
    *B29L 31/30* (2006.01)

(52) U.S. Cl.
    CPC .... *B29K 2105/089* (2013.01); *B29K 2307/04* (2013.01); *B29L 2031/3076* (2013.01)

(58) Field of Classification Search
    CPC ....... B29C 70/222; B29C 70/46; B64C 25/42; B32B 5/262
    See application file for complete search history.

(56) References Cited

U.S. PATENT DOCUMENTS

| | | | | |
|---|---|---|---|---|
| 7,926,761 | B2* | 4/2011 | Coupe | B29C 70/48 |
| | | | | 244/102 R |
| 10,017,244 | B2* | 7/2018 | Mandel | B29C 66/304 |
| 10,746,046 | B2* | 8/2020 | Provost | B29B 11/16 |
| 11,485,184 | B2* | 11/2022 | Stieglitz | B60G 7/00 |
| 11,649,850 | B2* | 5/2023 | Funck | F16C 7/026 |
| | | | | 384/280 |
| 2010/0105268 | A1 | 4/2010 | Ouellette et al. | |
| 2017/0198591 | A1 | 7/2017 | Roussille et al. | |

FOREIGN PATENT DOCUMENTS

| | | |
|---|---|---|
| CN | 112601849 A | 4/2021 |
| EP | 1 736 674 A1 | 12/2006 |
| FR | 3 106 519 A1 | 7/2021 |
| FR | 3 116 545 A1 | 5/2022 |
| JP | 2015-086491 A | 5/2015 |

OTHER PUBLICATIONS

International Preliminary Report on Patentability and the Written Opinion of the International Searching Authority as issued in International Patent Application No. PCT/FR2023/050872, dated Dec. 18, 2024.

First Office Action as issued in Chinese Patent Application No. 202380053384.0, dated Mar. 28, 2025.

* cited by examiner

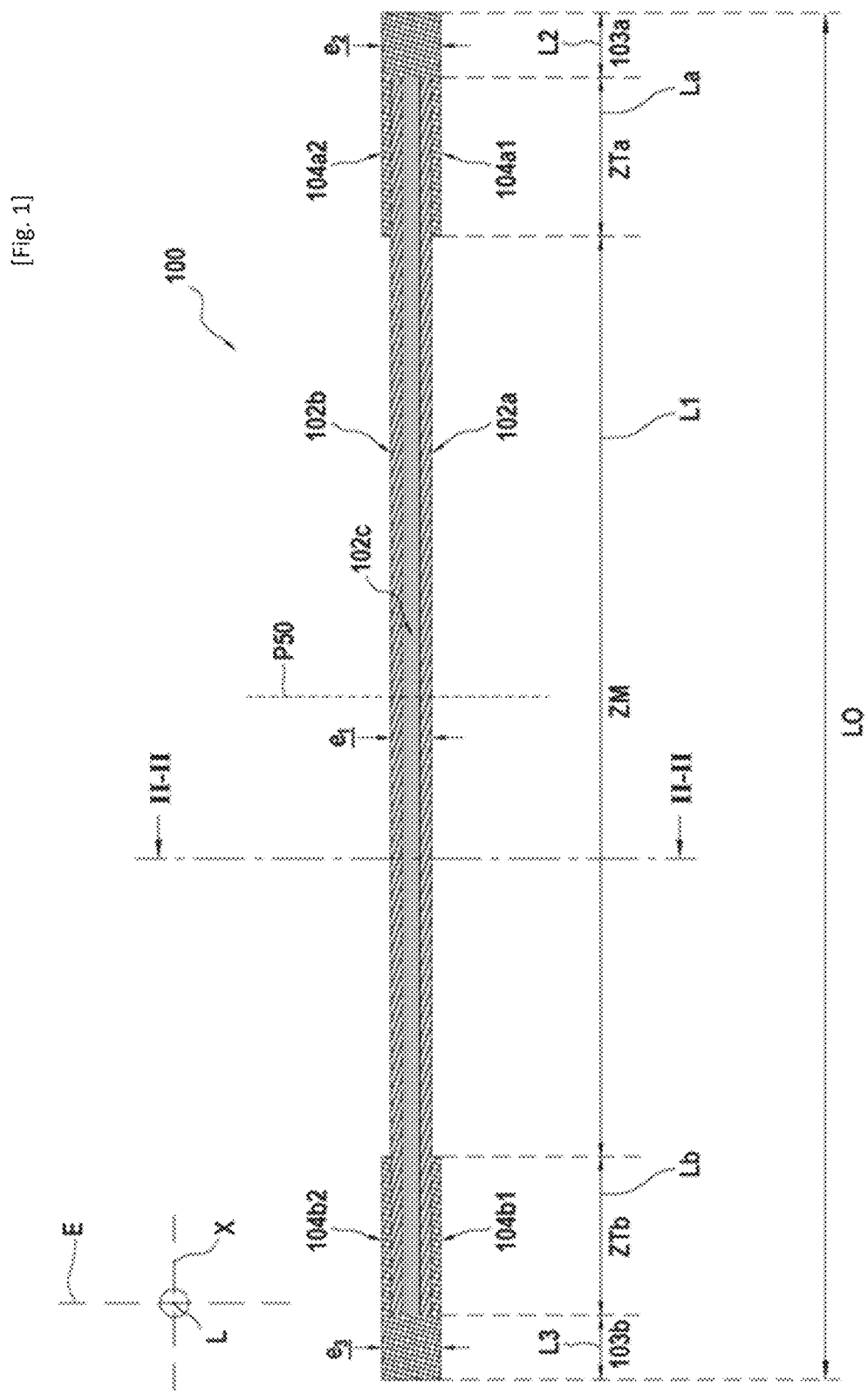

[Fig. 2]
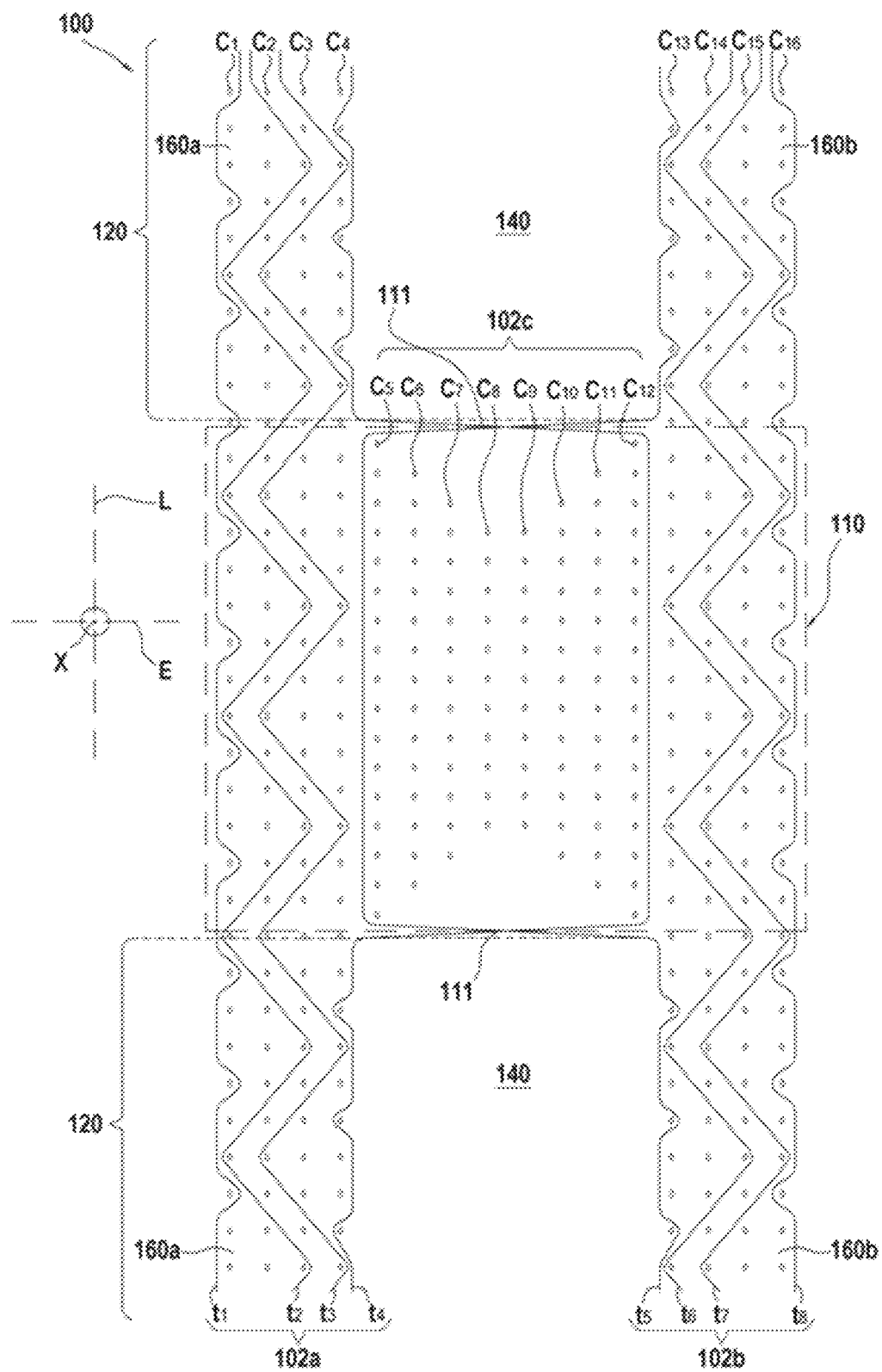

[Fig. 3A]
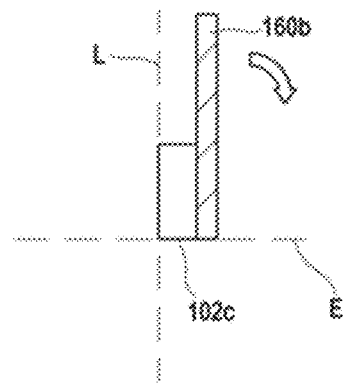
[Fig. 3B]
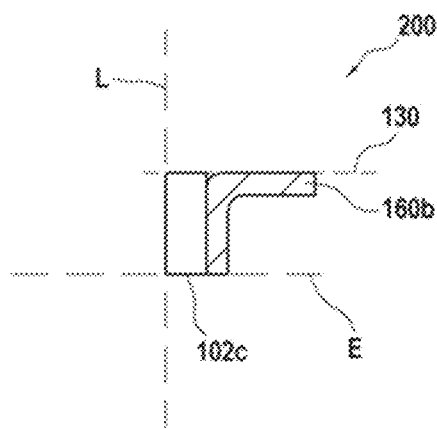
[Fig. 3C]
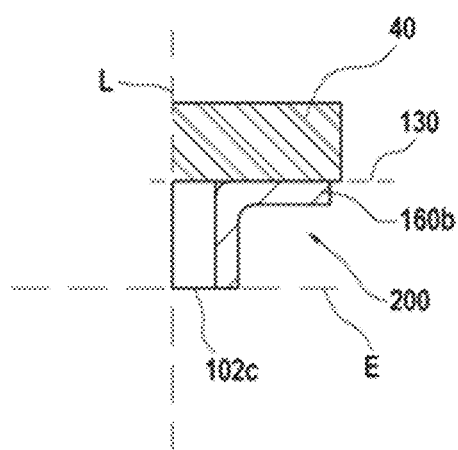

[Fig. 4]
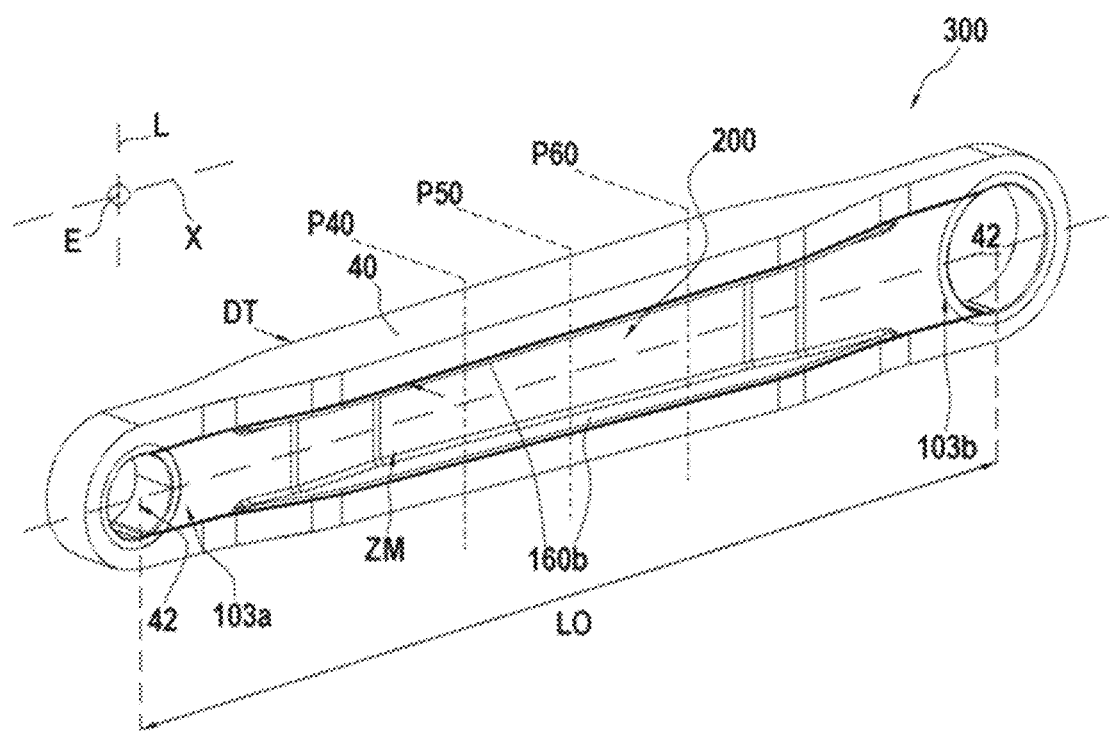

FIBROUS REINFORCEMENT FOR THE MANUFACTURE OF A COMPOSITE PART INTENDED TO BE ARTICULATED WITH OTHER PARTS

CROSS-REFERENCE TO RELATED APPLICATIONS

This application is the U.S. National Stage of PCT/FR2023/050872, filed Jun. 16, 2023, which in turn claims priority to French patent application number 2206170 filed Jun. 22, 2022. The content of these applications are incorporated herein by reference in their entireties.

TECHNICAL FIELD

The invention relates to a fibrous preform intended to form a portion of a fibrous reinforcement of a part made of composite material, which part is intended to be articulated with other parts at its ends, and to an associated manufacturing method.

Prior Art

The use of composite materials to replace metal materials can be proposed with a view to lightening, which is a constant concern in the particular case of aircraft parts. In this view, document U.S. Pat. No. 7,704,429 proposed the manufacture of landing gear struts made of composite material which comprise regions, called forks, which are intended for articulation and the stress introduction with other parts and are formed by a laminated structure with intercalation of plies between primary plies extending the body of the reinforcement. This solution can nevertheless have disadvantages. Indeed, the forks which have a laminated configuration can lead to an increase in the size of the stress introduction areas compared to the metal parts in order to avoid the risk of delamination. The weight saving of the overall system then becomes less interesting and the integration of the part more restrictive due to an increased bulk. Another problem is that the proposed manufacturing technique involves significant manual intervention that can lead to non-conformities and increased cost. Finally, the mechanical performance of the composite material proposed in this document can be improved, particularly in terms of compressive strength over a median area of the length of the part called the common area. One option to address this is to add material in the common area, which then penalizes the mass and therefore does not provide complete satisfaction.

The invention proposes to address all or a portion of the aforementioned disadvantages.

DISCLOSURE OF THE INVENTION

The invention relates to a fibrous preform of a core portion of a fibrous reinforcement for a composite material part, the preform having an elongated shape along a longitudinal direction and being formed by first yarns extending along the longitudinal direction with second yarns transverse to the first yarns, the preform comprising two longitudinal ends intended for articulation with other parts and a median area located between the longitudinal ends, each longitudinal end having a thickness greater than a thickness of the median area, the median area comprising a stiffening segment comprising first non-woven yarns and each longitudinal end comprising a three-dimensional weave of the first yarns of this stiffening segment with second yarns.

The invention proposes an optimized design of a core preform of a fiber reinforcement of the core-belt assembly type which is based on the three-dimensional weaving technique and on articulation areas in excess thickness compared to the median area, or common area, in order to obtain improved resistance to the stress introduction areas. The stiffening segment allows to significantly improve the compression performance of the median area compared to a structure obtained entirely by three-dimensional weaving. The invention also limits, or even avoids, weaving with second yarns in the median area, which reduces the consumption of material as well as the treatments subsequent to the textile operation such as cutting. The first yarns of the stiffening segment are woven by three-dimensional weaving on the longitudinal ends so as to obtain the desired resistance to stresses in the articulation areas.

In one exemplary embodiment, the fibrous preform comprises woven skins located on either side of the stiffening segment with the first yarns of this stiffening segment held by yarns coming from said woven skins.

Such a feature advantageously allows to improve the impact resistance of the fiber reinforcement.

In particular, the woven skins may comprise folded, non-interlinked lateral fibrous segments forming, on upper and lower sides of the preform, a positioning surface for a fibrous belt texture.

Such a feature helps to improve the quality of the interface between the core and the belt and to further improve the mechanical performance of the part.

In one exemplary embodiment, the preform further comprises, between each longitudinal end and the median area, a transition area comprising additional layers of first yarns compared to those present in the median area which are woven with second yarns in the longitudinal ends.

Such a feature advantageously allows to achieve a greater increase in thickness in the longitudinal ends and therefore to further improve the mechanical properties of the part.

In an exemplary embodiment, the preform is made of carbon yarns.

The invention also relates to a method for manufacturing a fibrous reinforcement of a composite material part, comprising:
 positioning a woven fibrous belt texture on a preform of a core portion as described above, the belt texture defining a loop around the preform of the core portion so as to define, at the longitudinal ends, free spaces intended for articulation with other parts.

In one exemplary embodiment, the belt texture is made of carbon yarns.

The invention also relates to a method for manufacturing a composite part intended to be articulated with other parts, comprising:
 forming a fibrous reinforcement as described above, and forming a matrix in a porosity of the fibrous reinforcement thus obtained.

In one exemplary embodiment, the matrix is an organic matrix.

In one exemplary embodiment, the part is a landing gear strut, a portion of a landing gear strut, or a brake bar.

BRIEF DESCRIPTION OF THE DRAWINGS

FIG. 1 schematically shows an example of a fibrous texture intended to form a preform according to the invention.

FIG. 2 schematically shows a cross-section of the texture of FIG. 1.

FIG. 3A schematically and partially shows a first step of a possible shaping for the texture of FIGS. 1 and 2.

FIG. 3B schematically and partially shows a second step of a possible shaping for the texture of FIGS. 1 and 2.

FIG. 3C schematically and partially shows a third step of a possible shaping for the texture of FIGS. 1 and 2 as well as the positioning of the belt.

FIG. 4 is a perspective view of an example of a core-belt assembly type fibrous reinforcement according to the invention.

DESCRIPTION OF THE EMBODIMENTS

FIG. 1 shows a woven fibrous texture 100 which is intended to form, after shaping, a fibrous preform 200 (see FIGS. 3B, 3C and 4) of a core of a fibrous reinforcement for a composite material part. A possible shaping for the texture will be described below in connection with FIGS. 3A to 3C. The texture 100 and the preform 200 have an elongated shape extending along a longitudinal direction X and can be obtained by weaving into a single part. The texture 100 and the preform 200 successively comprise along the direction X a first longitudinal end 103a, a median area ZM and a second longitudinal end 103b. In the illustrated example, there is also the presence of a first transition area ZTa between the first end 103a and the median area ZM and of a second transition area ZTb between the median area ZM and the second end 103b. The presence of the transition areas ZTa and ZTb is considered in the illustrated example but remains optional within the framework of the invention. According to one example, each transition area ZTa, ZTb possibly present may have a length La, Lb comprised between 1% and 20% of the length LO of the texture 100 or the preform 200, and each end 103a, 103b may have a length L2, L3 comprised between 1% and 20% of the length LO. The lengths are measured along the direction X. The median area ZM may be centered relative to a plane P50 located at mid-length of the texture 100 or the preform 200 and perpendicular to the direction X. In the example illustrated in FIG. 1, the thickness e2 of the first end 103a is greater than the thickness e1 of the median area ZM. The thickness e3 of the second end 103b is less than the thickness e2 but greater than the thickness e1. The thicknesses are measured along the thickness direction (direction E) and correspond to the smallest dimension. In one example, the ratio e2/e1 may be greater than 1 and less than or equal to 4, for example comprised between 1.5 and 2.5, and the ratio e3/e1 may be greater than 1 and less than or equal to 4, for example comprised between 1.5 and 2.5.

The textile architecture differs between the ends 103a, 103b, the transition areas ZTa, ZTb and the median area ZM as will be detailed below. The ends 103a, 103b are obtained by three-dimensional weaving of first yarns which extend along the direction X with second yarns transverse to the first yarns, for example with an "interlock" weaving pattern. In the example illustrated, a portion of the first yarns present in the ends 103a, 103b form, in the median area ZM, a stiffening segment 102c and are not woven with second yarns in this segment 102c. The first yarns may extend, in the stiffening segment 102c, in a substantially rectilinear manner. The stiffening segment 102c may comprise unidirectional layers of first yarns. In general, the first non-woven yarns may be in the majority in number (more than 50%) in the median area ZM, for example representing at least 80% in number of all the yarns present in the median area ZM. Second yarns are added in the longitudinal ends 103a, 103b so as to weave the first yarns of the stiffening segment 102c. These added second yarns correspond to additional layers of yarns compared to the layers of second yarns possibly present in the median area ZM. FIG. 2 illustrates a view, in cross section, relative to the direction X, of a possible textile configuration at the median area ZM. The texture 100 comprises a central segment 110 having, on its opposite sides 111, two positioning edges 120 which each comprise non-interlinked lateral segments 160a, 160b separated by a non-interlinked area 140 allowing a spacing of these segments 160a, 160b relative to each other. The positioning edges 120 and the central segment 110 are offset along the width direction L, and the non-interlinked segments 160a, 160b are offset along the thickness direction E. The central segment 110 comprises the stiffening segment 102c comprising the first non-woven yarns C5-C12. Woven skins 102a, 102b, for example obtained by three-dimensional weaving, for example by "interlock" weaving, are present in the central segment 110 and extend beyond it so as to form the non-interlinked segments 160a, 160b. The skins 102a, 102b are formed by a weave between first yarns C1-C4 and C13-C16 extending along the longitudinal direction X with second yarns t1-t8 extending along the direction L. In general, it will be recognized that the number of layers of yarns as well as the weaving pattern illustrated are provided only by way of example and can be modified without departing from the scope of the invention. The skins 102a, 102b are located in the median area ZM and their extension defines in the ends 103a, 103b a single piece of fabric extending over the entire width and thickness of the texture 100 or of the preform 200. The yarns C5-C12 of the stiffening segment 102c are located between the skins 102a, 102b and held together by yarns coming therefrom. Indeed, it is noted that the yarn t4 extends in the first skin 102a outside the central segment 110 and is deflected in order to emerge from this first skin 102a to bind the set 102c of yarns C5-C12 in the central segment 110. Similarly, the yarn t5 extends in the second skin 102b outside the central segment 110 and is deflected in order to emerge from this second skin 102b to bind the set 102c of yarns C5-C12 in the central segment 110 on the side opposite the yarn t4. An encapsulation of the stiffening segment 102c formed by the yarns C5-C12 is thus obtained between the skins 102a, 102b, these yarns C5-C12 being held in place by the deflected yarns t4-t5. In the illustrated example, in the central segment 110 there are successively along the thickness direction E: the first skin 102a, the segment 102c of non-woven yarns and the second skin 102b. It will be noted that the segment 102c of non-woven yarns is only present in the central segment 110 and not in the positioning edges 120. This allows a saving of yarn in this area and avoids a manual cutting step if these yarns were woven. As indicated above, the yarns C5-C12 are not woven over only a portion of the length of the first texture 100 or of the preform 200, over its median area ZM and possibly over the transition areas ZTa, ZTb, and are woven into the longitudinal ends 103a, 103b. The length where the yarns C5-C12 are non-woven may be greater than or equal to 50%, for example 75%, of the length LO of the texture 100 or the preform 200.

FIGS. 3A to 3C illustrate, in a simplified manner, the shaping of the texture 100 of FIGS. 1 and 2 in order to obtain the preform 200 as well as the positioning of the second belt texture 40, it being understood that the configuration is symmetrical with respect to the directions L and E. In the considered example, there is deployment of the non-interlinked segments 160a, 160b on a shape (not illustrated) so as to form an angle substantially of 90° with the direction L and to position the non-interlinked segments 160*a*, 160*b* at the height of the segment 102*c*. This height is taken along the direction L. A preform 200 is thus obtained having a positioning surface 130 of substantially planar shape with, at the same level, the non-interlinked segments 160*a*, 160*b* as well as the segment 102*c* which is located between these non-interlinked segments and thus defines a bearing surface for the belt texture 40. The preform 200 may have an I-shape (called a double angle shape) in cross section relative to the longitudinal direction X. In the example of FIG. 1, there is a transition area ZTa, ZTb between the median area ZM and the ends 103*a*, 103*b*. The stiffening segment 102*c* is also present in the transition areas ZTa, ZTb but the skins 104*a*1, 104*a*2, 104*b*1 and 104*b*2 are thickened relative to the skins 102*a*, 102*b* of the median area ZM. Indeed, there is an addition in this area of layers of additional first yarns relative to those present in the median area ZM. The layers of first yarns added in this area can, as illustrated, be progressively woven with second yarns so as to form the skins 104*a*1, 104*a*2, 104*b*1 and 104*b*2 and extend into the ends 103*a*, 103*b* in order to obtain the desired thickness for the latter when a significant excess thickness is sought.

FIG. 4 shows an example of a core-belt assembly according to the invention forming the fibrous reinforcement 300 of the part to be obtained. The woven belt texture 40 has been positioned around the preform 200 obtained after shaping the texture 100 by folding down the non-interlinked segments 160*a*, 160*b*. The texture 40 can have the shape of a strip which is wrapped around the preform 1. When it is positioned, the texture 40 bears on the positioning surface 130. The texture 40 can be in the form of a single strip of fabric but it is not outside the scope of the invention if it is in the form of several strips placed end to end or side by side. The texture 40 can also be obtained by three-dimensional weaving, for example with an "interlock" weaving pattern. The texture 40 defines a closed loop around the preform 200 and defines free spaces 42 intended for articulation with the other parts. Inserts (not shown) can be used temporarily at the longitudinal ends 103*a*, 103*b* and the second texture 40 can be wrapped around them so as to ensure the desired shape for the end regions. The ends 103*a*, 103*b* can, as illustrated, have a curved shape, for example substantially circular. The transverse dimension DT of the positioning surface 130 increases from the first end 103*a* to the median area ZM, is maximum in the vicinity of the mid-length plane P50 of the preform 200, for example at least on the section located between the planes P40 and P60 located at 40% and 60% of the length LO and perpendicular to the direction X, then decreases towards the second end 103*b*. The positioning surface 130 defines lateral fins for positioning the belt texture 40. The volume ratios between the warp and weft yarns of each of the preform 200 and the belt texture 40 may be similar, for example with a difference of at most 10%. These volume ratios correspond to the ratio: [volume occupied by the warp yarns]/[volume occupied by the weft yarns] for each textile considered.

A densification of the entire preform 200 and texture 40 is then carried out, for example by introducing a resin, such as an epoxy resin, followed by crosslinking thereof if it is a thermosetting resin or by cooling if it is a thermoplastic resin. The formation of the matrix can be carried out by resin transfer molding technique which corresponds to a technique known per se. A composite material part is thus obtained intended to be articulated with other parts at its longitudinal ends and to undergo tensile and compressive stresses. The fibrous reinforcement of the part can be formed of carbon yarns and the part can have an organic matrix as just described. The part may or may not be intended for an aeronautical application. The part can for example be a connecting rod, a landing gear strut or a constituent element thereof, or a brake bar. The part obtained can be mounted to other parts by positioning through the free spaces 42 a hinge pin for connection to other parts as well as a contact insert with this pin.

The invention claimed is:

1. A method for manufacturing a fibrous reinforcement of a composite material part, comprising:
    positioning a woven fibrous belt texture on a fibrous preform of a core portion of a fibrous reinforcement for a composite material part, the preform having an elongated shape along a longitudinal direction, the preform comprising two longitudinal ends intended for articulation with other parts and a median area located between the longitudinal ends, each longitudinal end having a thickness greater than a thickness of the median area, the median area comprising a stiffening segment comprising first yarns that are non-woven on the stiffening segment and extending along the longitudinal direction, each longitudinal end comprising a three-dimensional weave of said first yarns that are non-woven on the stiffening segment with second yarns that are transverse to the first yarns, the woven fibrous belt texture defining a loop around the preform of the core portion so as to define, at the longitudinal ends, free spaces intended for articulation with other parts.

2. The method according to claim 1, wherein the fibrous preform comprises woven skins located on either side of the stiffening segment with said first yarns that are non-woven on the stiffening segment being held by yarns coming from said woven skins.

3. The method according to claim 2, wherein the woven skins comprise folded, non-interlinked lateral fibrous segments forming, on upper and lower sides of the preform, a positioning surface for the woven fibrous belt texture.

4. The method according to claim 1, wherein the preform further comprises, between each longitudinal end and the median area, a transition area comprising additional layers of first yarns compared to those present in the median area which are woven with the second yarns in the longitudinal ends.

5. The method according to claim 1, wherein the preform is made of carbon yarns.

6. The method according to claim 1, wherein the woven fibrous belt texture is made of carbon yarns.

7. A method for manufacturing a composite part intended to be articulated with other parts, comprising:
    forming a fibrous reinforcement according to claim 1, and
    forming a matrix in a porosity of the fibrous reinforcement thus obtained.

8. The method according to claim 7, wherein the matrix is an organic matrix.

9. The method according to claim 7, wherein the part is a landing gear strut, a portion of a landing gear strut, or a brake bar.

\* \* \* \* \*